(12) United States Patent
Davis et al.

(10) Patent No.: US 7,128,342 B2
(45) Date of Patent: Oct. 31, 2006

(54) LINEAR TRACKING KNEE BOLSTER ASSEMBLY

(75) Inventors: Alan C. Davis, Fenton, MI (US);
Richard K. Riefe, Saginaw, MI (US);
Ronald H. Dybalski, Oxford, MI (US);
Frederick J. Berg, Auburn, MI (US);
Bruce M. Collier, Saginaw, MI (US);
Richard P. Nash, Frankenmuth, MI (US); Minoo J. Shah, Farmington, MI (US); Jason R. Ridgway, Bay City, MI (US); Paul E. Balius, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 358 days.

(21) Appl. No.: 10/768,533

(22) Filed: Jan. 30, 2004

(65) Prior Publication Data
US 2005/0029791 A1 Feb. 10, 2005

Related U.S. Application Data

(60) Provisional application No. 60/473,787, filed on May 28, 2003, provisional application No. 60/447,060, filed on Feb. 13, 2003, provisional application No. 60/444,297, filed on Jan. 31, 2003.

(51) Int. Cl.
*B62D 1/19* (2006.01)

(52) U.S. Cl. .......................... 280/777; 280/750; 74/493

(58) Field of Classification Search ................ 280/751, 280/752, 753, 775, 776, 777, 748, 750; 180/90; 296/70; 74/493
See application file for complete search history.

(56) References Cited

U.S. PATENT DOCUMENTS

| | | | |
|---|---|---|---|
| 4,948,168 A | | 8/1990 | Adomeit et al. |
| 5,131,681 A | * | 7/1992 | Wetzel et al. ................ 280/753 |
| 5,476,283 A | * | 12/1995 | Elton .......................... 280/753 |
| 5,496,066 A | | 3/1996 | Hoffmann et al. |
| 5,931,520 A | * | 8/1999 | Seksaria et al. .............. 296/70 |
| 6,176,544 B1 | * | 1/2001 | Seksaria et al. ........ 296/203.02 |
| 6,270,112 B1 | * | 8/2001 | Bowers .................... 280/728.3 |
| 6,283,508 B1 | | 9/2001 | Nouwynck et al. |
| 6,641,166 B1 | * | 11/2003 | Browne et al. ............. 280/752 |
| 6,722,226 B1 | * | 4/2004 | Neag et al. .................... 74/512 |
| 7,063,354 B1 | * | 6/2006 | Riefe et al. ................. 280/777 |
| 2003/0057693 A1 | * | 3/2003 | Neag et al. ................. 280/753 |

FOREIGN PATENT DOCUMENTS

| | | |
|---|---|---|
| DE | 39 08 713 | 10/1989 |
| EP | 0 421 572 | 4/1991 |
| EP | 1 452 402 | 9/2004 |

* cited by examiner

*Primary Examiner*—Paul N. Dickson
*Assistant Examiner*—Toan C. To
(74) *Attorney, Agent, or Firm*—Michael D. Smith

(57) ABSTRACT

A collapsible steering assembly features a guide bracket for attachment to a vehicle. A steering mechanism is interconnected with the guide bracket by a steering mechanism support. A plurality of guide rods are arranged about a common collapse axis and extend in non-parallel relationship to a longitudinal axis of the steering mechanism. The guide rods support the steering mechanism for axial movement along the collapse axis in response to a predetermined collapse force on the steering mechanism.

29 Claims, 7 Drawing Sheets

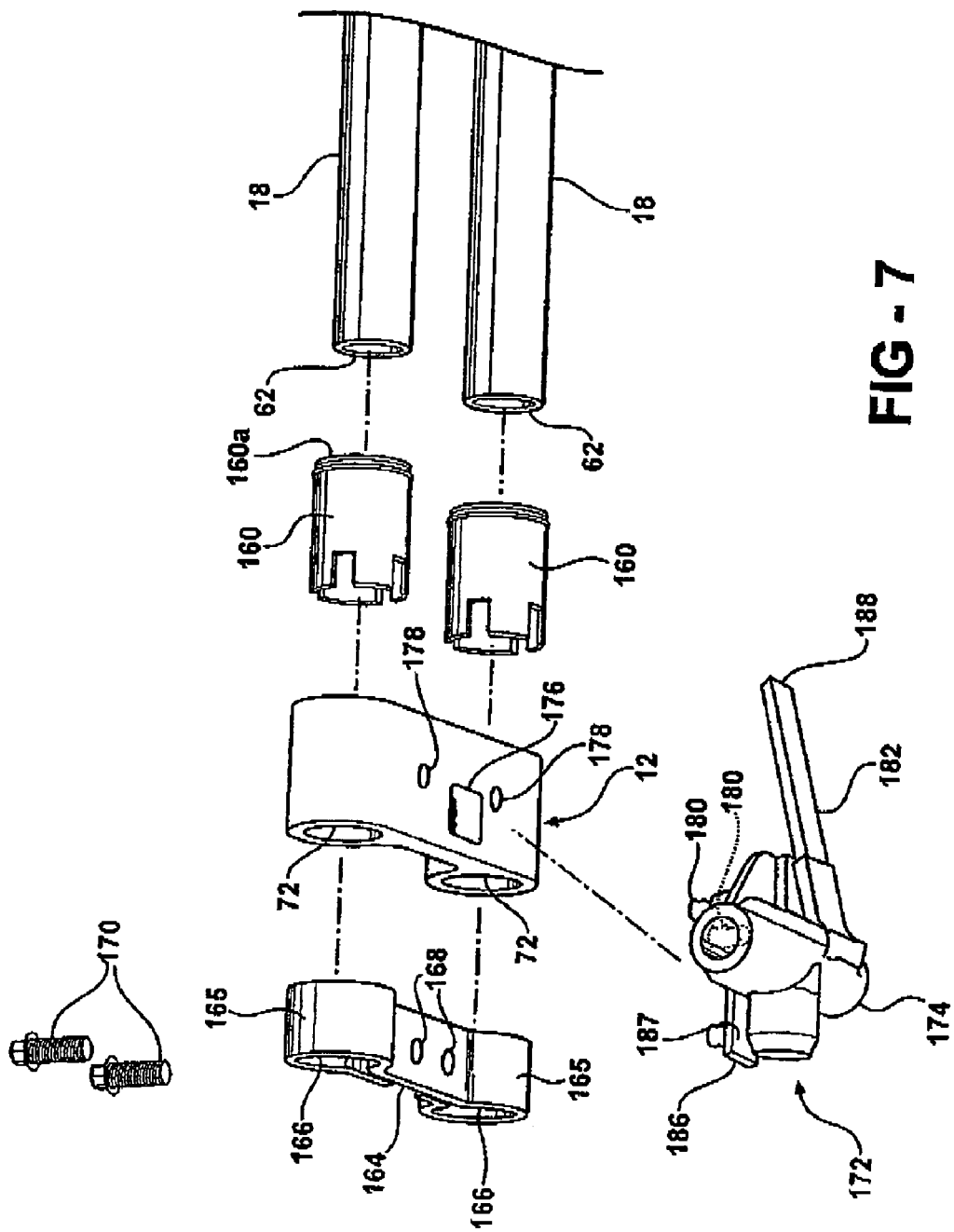

LINEAR TRACKING KNEE BOLSTER ASSEMBLY

CROSS-REFERENCES TO RELATED APPLICATIONS

This Application claims the benefit of U.S. Provisional Patent Application No. 60/444,297 filed on Jan. 31, 2003, U.S. Provisional Patent Application No. 60/447,060 filed on Feb. 13, 2003, and U.S. Provisional Patent Application No. 60/473,787 filed on May 28, 2003.

FIELD OF THE INVENTION

The subject invention relates to a vehicle knee bolster assembly having components movable in response to a crash condition.

BACKGROUND OF THE INVENTION

Collapsible knee bolster assemblies are well known in the art. Such assemblies typically include a bracket or other support affixed to the body of a vehicle. A knee bolster is carried by the bracket or support. Should a collision occur in which a sufficiently large impact force is applied to the knee bolster, the bolster will collapse relative to the support and translate away from the knees of the vehicle occupant sitting in front of the bolster.

A limited number of assemblies include a steering column and knee bolster mounted on a single support mechanism; however, such assemblies do not permit independent movement of the column and bolster relative to the support mechanism.

SUMMARY OF THE INVENTION AND ADVANTAGES

The present invention provides a collapsible knee bolster assembly including a stationary mounting bracket for attachment to a vehicle support structure and a knee bolster. A knee bolster guide system connects the knee bolster to the mounting bracket. The bolster guide system also supports the knee bolster for guided, sliding movement along a predetermined collapse path in response to application of a predetermined collapse force to the knee bolster.

Accordingly, the subject invention overcomes the limitations of the related art by providing a collapsible knee bolster assembly which utilizes a knee bolster guide system to interconnect a knee bolster with a mounting bracket. A steering mechanism and other components may also be connected to the mounting bracket. This permits the mounting bracket to serve as the primary structure supporting the components of the knee bolster assembly, which in turn allows the knee bolster assembly to be assembled and then transported to an end user as a single unit for installation on a vehicle. The knee bolster guide system utilizes bolster guide rods capable of collective movement, which allows the knee bolster to simultaneously translate with the rods relative to the mounting bracket. The bolster guide rods are also oriented to allow the knee bolster to translate in a direction corresponding to the typical trajectory path of the knees of a driver or a passenger during a collision, which enhances the energy absorbed by the knee bolster assembly. When utilized in combination with the steering mechanism, the knee bolster guide rods are oriented in a direction other than parallel to the longitudinal axis of the steering mechanism, which further enhances the amount of energy absorbed by the knee bolster assembly during a collision.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is a cutaway perspective view of the bolster tubes, bolster shear elements, energy absorbing device and brackets associated therewith.

DETAILED DESCRIPTION OF THE PREFERRED EMBODIMENT

Referring to the Figures, wherein like numerals indicate like or corresponding parts throughout the several views, a collapsible knee bolster assembly is generally shown at 10 in FIGS. 1 through 6. The assembly 10 includes a stationary mounting bracket 12 for attachment to a vehicle support structure. The assembly 10 also includes a knee bolster 14. A knee bolster guide system 16 connects the knee bolster 14 and the mounting bracket 12 and supports the knee bolster 14 for guided, sliding movement along a predetermined collapse path in the direction "D" shown. The sliding movement occurs in response to application of a predetermined collapse force to the knee bolster 14.

Figure 2:
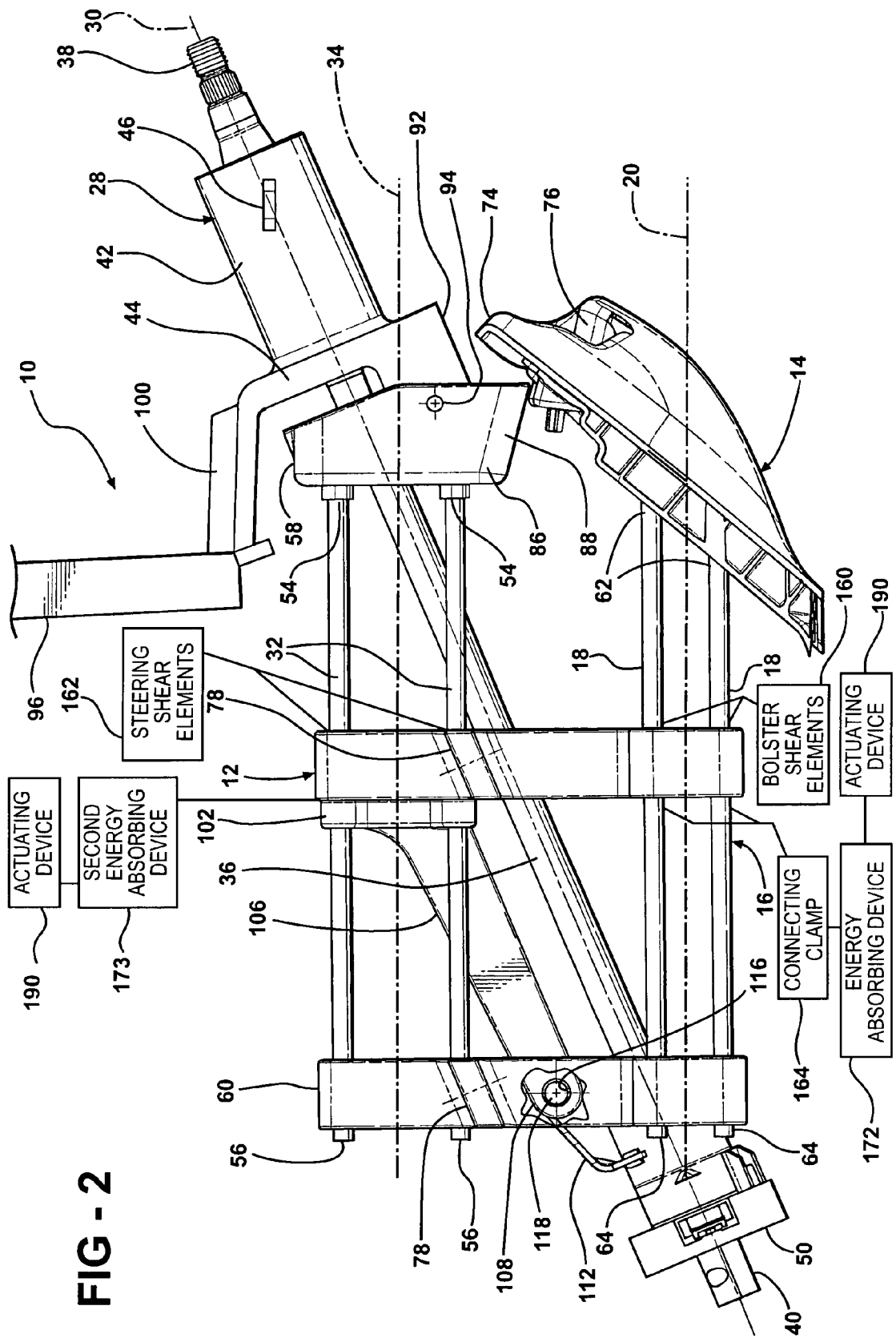
FIG. 2 is a side view of a collapsible knee bolster assembly in an operative position prior to a collision event and with the pedal assembly removed.
Figure 3:
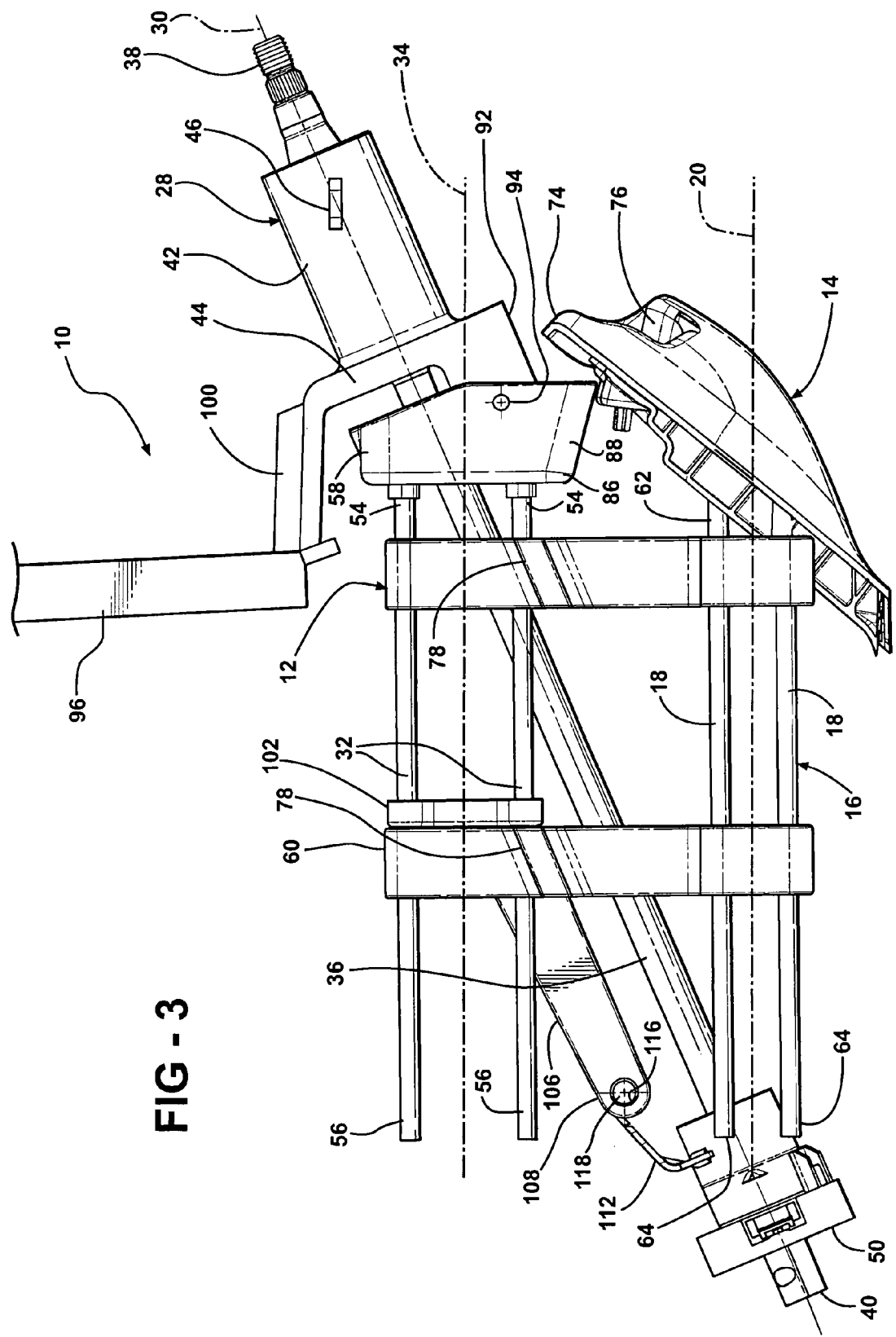
FIG. 3 is a side view of the collapsible knee bolster assembly shown in FIG. 2 in a collapsed position in response to a collision event.

Referring now to FIG. 2, the knee bolster guide system 16 includes a plurality of bolster guide rods 18. The bolster guide rods 18 are arranged about a common collapse axis 20 that extends parallel to the direction "D" of the collapse path. The guide rods 18 interconnect the mounting bracket 12 and the knee bolster 14. The bolster guide rods 18 also support the guided, sliding movement of the knee bolster 14 along the predetermined collapse path. The mounting bracket 12 supports the bolster guide rods 18 in fixed relationship to one another, which in turn permits collective movement of the guide rods 18 relative to the mounting bracket 12 in response to the predetermined collapse force on the knee bolster 14. The assembly 10 is shown in FIG. 2 prior to a collision event resulting in a collapse force on the knee bolster 14 sufficient to cause the assembly 10 to collapse. The assembly is shown in FIG. 3 after application of the predetermined collapse force to the knee bolster 14 and translation of the knee bolster 14 along the predetermined collapse path.

Figure 1:
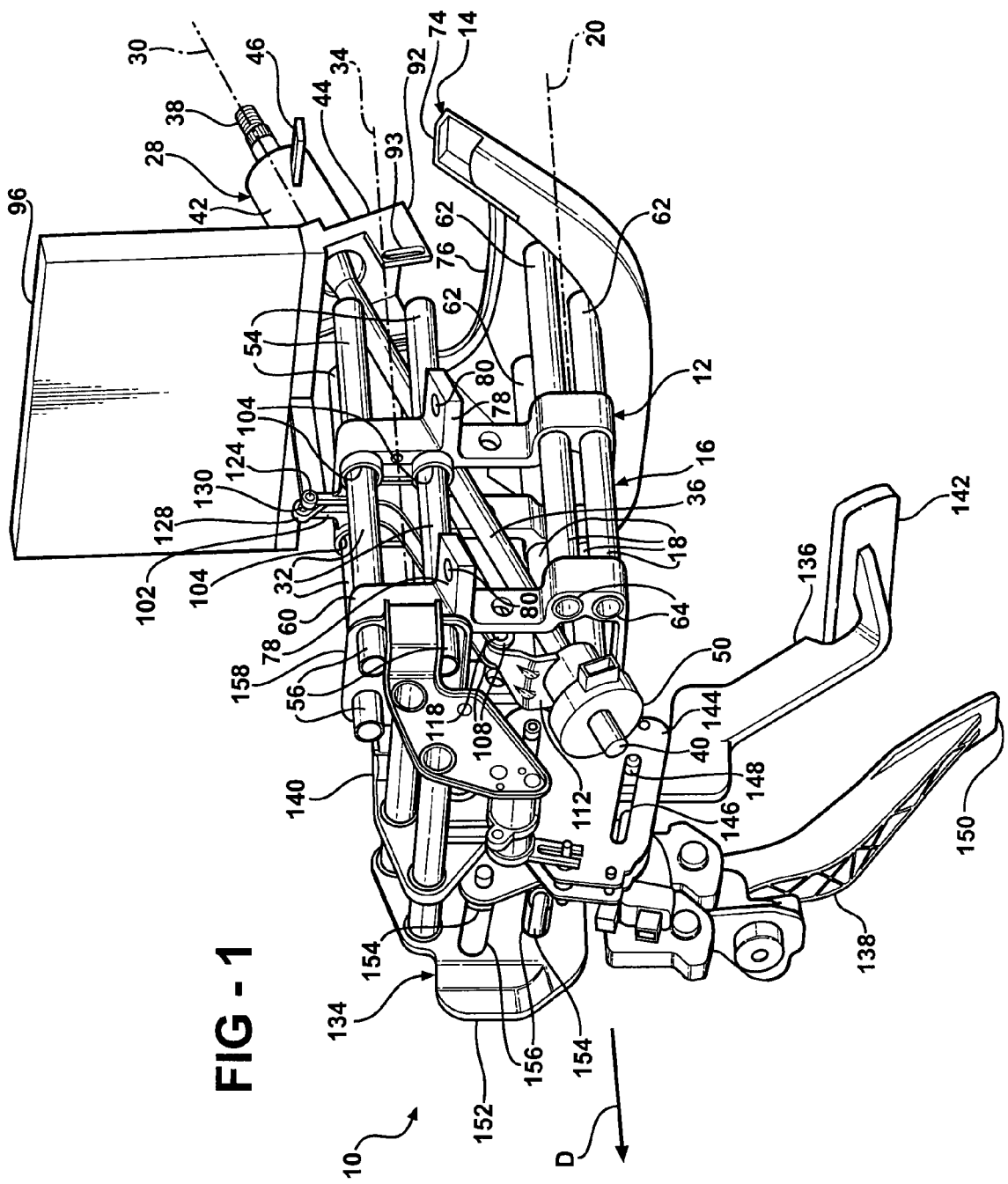
FIG. 1 is a rear perspective view of a collapsible knee bolster assembly according to an embodiment of the present invention with the front bracket removed.

Although each of the bolster guide rods 18 may have any suitable shape, each guide rod 18 shown in FIG. 1 is straight and comprises a bolster tube. Although any number of guide rods, or bolster tubes, 18 may be utilized and arranged in any suitable configuration relative to the mounting bracket 12, the bolster tubes 18 of the present invention include four tubes spaced from one another in a quadrangle.

The collapsible knee bolster assembly 10 may be adapted for use on the passenger side of a vehicle or in any other passenger seating area in the vehicle. However, the knee bolster assembly 10 of the embodiment shown in FIGS. 1 through 6 includes a steering mechanism 28, and is intended for use in a driver seating area. The steering mechanism 28 is carried by the mounting bracket 12 and has a longitudinal axis 30 that extends in non-parallel relationship to the collapse axis 20. A plurality of steering guide rods 32 are arranged about a second collapse axis 34 and interconnect the mounting bracket 12 with the steering mechanism 28. The guide rods 32 support the steering mechanism 28 for guided, sliding movement along the second collapse axis 34 in response to application of a second predetermined collapse force to the steering mechanism 28.

Figure 4:
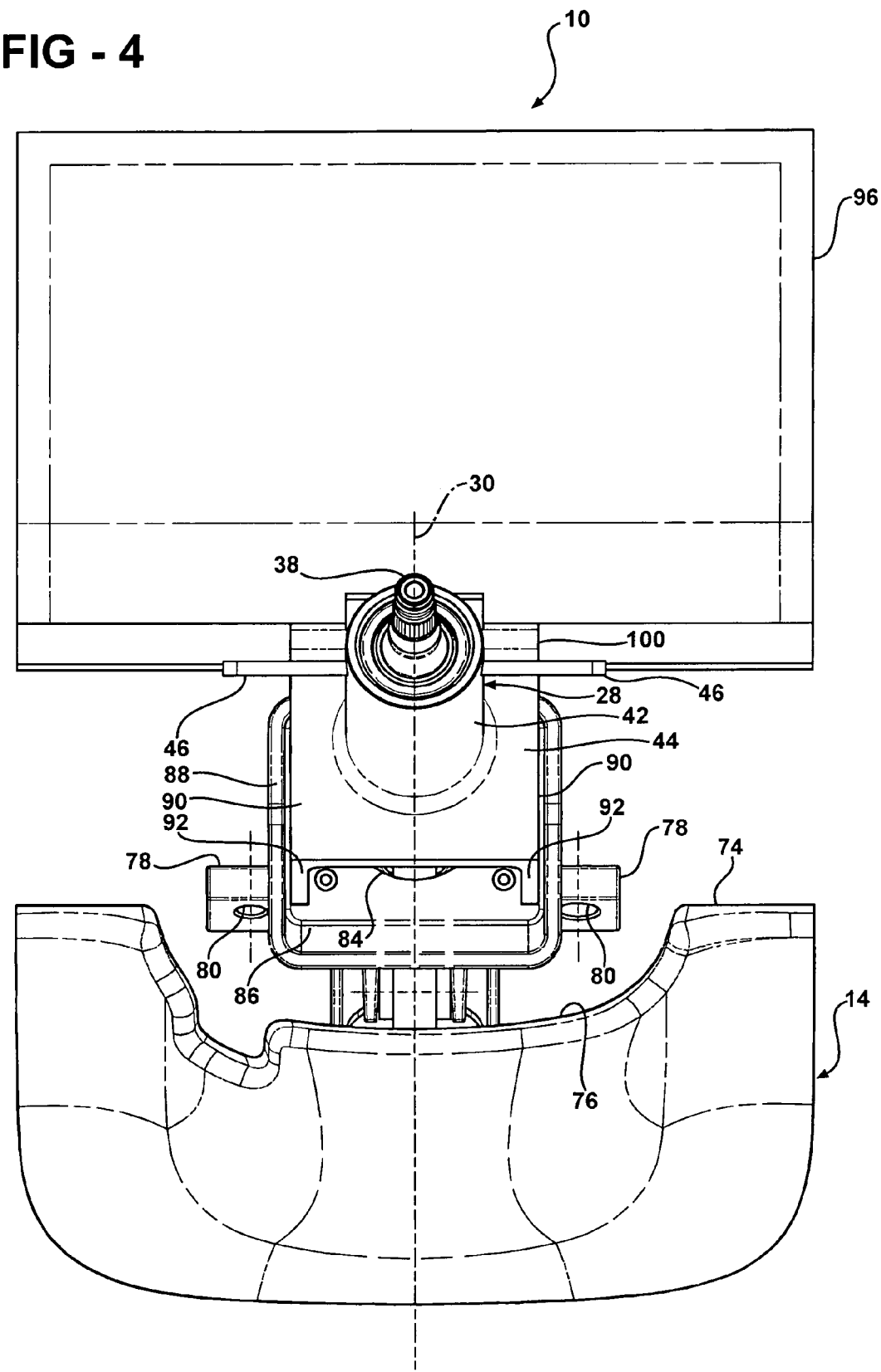
FIG. 4 is a front view of the collapsible knee bolster assembly shown in FIG. 2.
Figure 5:
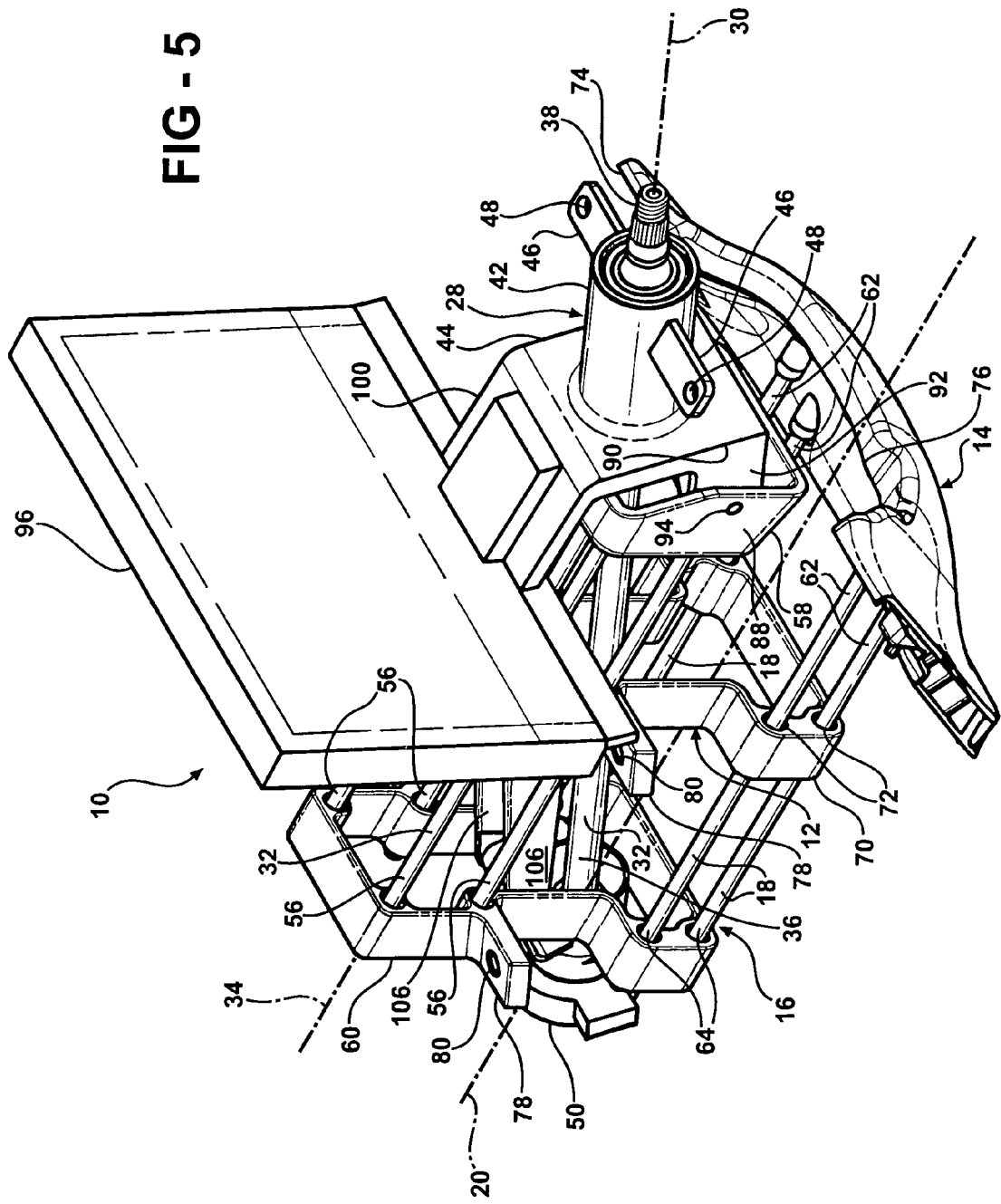
FIG. 5 is a front view of the collapsible knee bolster assembly shown in FIG. 2.
Figure 6:
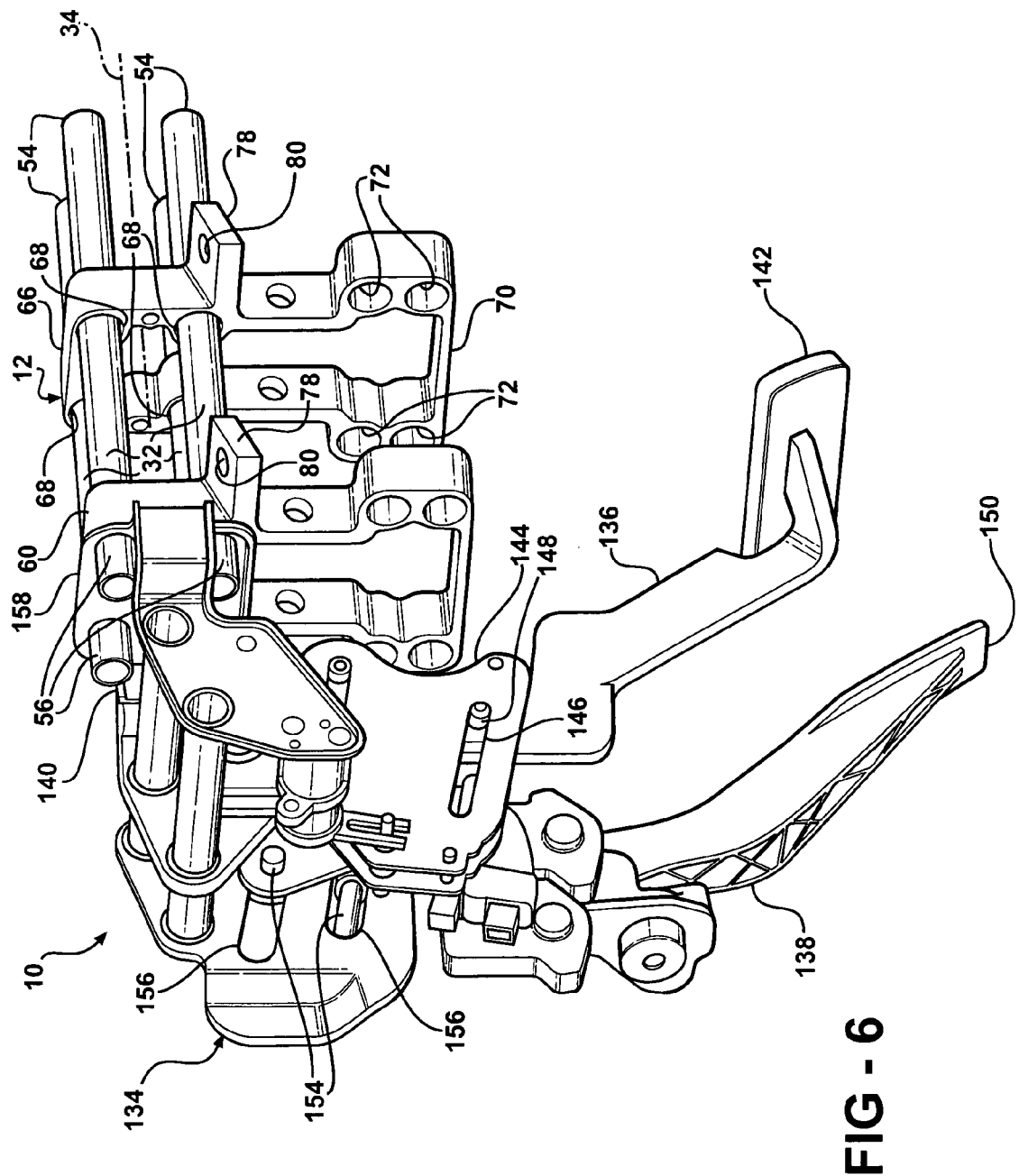
FIG. 6 is a rear perspective view of the collapsible knee bolster assembly shown in FIG. 2 with the steering assembly, knee bolster and knee bolster tubes removed.

The steering mechanism 28 includes a steering shaft 36 that extends coaxially with the longitudinal axis 30 between an upper end 38 and a lower end 40. An upper bearing housing 42 and a rake bracket 44 are coaxially disposed about the steering shaft 36 adjacent the upper end 38. As is best shown in FIGS. 4 and 5, connecting brackets 46 are disposed on the upper bearing housing 42 and extend therefrom. Each connecting bracket 46 has bore 48 therethrough for receiving a complementary fastener (not shown) to secure the bracket 46 to a surface of the vehicle support structure. A lower bearing housing 50 is coaxially disposed about the shaft 36 adjacent the lower end 40.

While the steering mechanism 28 shown in FIG. 1 includes a steering column, those skilled in the art will appreciate that the steering mechanism 28 used in the assembly 10 does not have to utilize a traditional column structure. The steering mechanism 28 may instead be a device that lacks a column. Such devices include, but are not limited to, steer-by-wire systems.

The mounting bracket 12 supports the steering guide rods 32 in fixed relationship to one another. The guide rods 32 and steering mechanism 28 move in a guided, sliding manner relative to the mounting bracket 12 in response to the second predetermined collapse force on the steering mechanism 28.

While each of the steering guide rods 32 may have any suitable shape, the guide rods 32 are straight and comprise steering tubes. Each guide rod, or steering tube, 32 has front and rear ends, 54 and 56. The steering tubes 32 of the present invention include four tubes spaced from one another in a quadrangle; however, any suitable number of steering tubes 32 may be arranged in any suitable configuration relative to the mounting bracket 12.

A front bracket 58 interconnects the front ends 54 of the steering tubes 32. A rear bracket 60 supports the rear ends 56 of the steering tubes 32. The front and rear brackets 58 and 60 are spaced on opposite sides of the mounting bracket 12, so that the mounting bracket 12 is spaced along the steering tubes 32 from and between the front and rear brackets 58 and 60.

Like the steering tubes 32, the bolster tubes 18 have front and rear ends, 62 and 64. As is best shown in FIG. 1, the knee bolster 14 is connected to the front ends 62 of the bolster tubes 18. The rear bracket 60 supports the rear ends 64 of the bolster tubes 18, such that the knee bolster 14 and rear bracket 60 are spaced from and on opposite sides of the mounting bracket 12. The rear ends 56 of the steering tubes 32 extend through the rear bracket 60.

The mounting bracket 12 has an upper block 66 with bores 68 through which the steering tubes 32 extend. The mounting bracket 12 also includes a lower block 70 having bores 72 therethrough. The bolster tubes 18 extend through the bores 72 in the lower block 70 and are disposed in at least one pair on either side of the steering tubes 18. The bolster tubes 54 are also disposed parallel to the steering tubes 18. The rear bracket 60 includes upper and lower blocks 66, 70 having respective bores 68, 72 therethrough that are identical to those of the mounting bracket 12.

Disposing the bolster tubes 54 outside the steering tubes 18 permits the knee bolster 14 to collapse without interfering with or otherwise initiating a simultaneous or subsequent collapse of the steering tubes 32 and steering mechanism 28. Furthermore, as is shown in FIG. 4, the knee bolster 14 includes an upper edge 74 having a concave portion 76, which allows non-interfering movement of the knee bolster 14 past the steering mechanism 28 and the front bracket 58.

The rear bracket 60 includes at least one and preferably two connectors 78 for attachment to the vehicle support structure. The mounting bracket 12 likewise includes at least one and preferably two connectors 78 for attachment to the vehicle support structure. Each connector 78 includes a bore 80 for receiving a complementary bolt (not shown) therethrough to attach the connector 78 to the vehicle support structure.

The front bracket 58 includes a central opening 84 and a peripheral edge 86 from which a collar 88 extends. The upper end 38 of the steering shaft 36, the upper bearing housing 42, and the rake bracket 44 extend through the opening 84. The lower end 38 of the steering shaft 36 and the lower bearing housing 50 extend beyond the rear bracket 60, whereby the front bracket 58, mounting bracket 12 and rear bracket 60 are spaced along the steering shaft 36 between the upper and lower ends 38 and 40.

The rake bracket 44 is connected to the front bracket 58. In particular, the rake bracket 44 includes opposed side edges 90 from which tabs 92 rearwardly extend. Each tab 90 includes a slot 92. The collar 88 includes holes 94, each of which is aligned with one of the slots 92. A complementary fastening mechanism (not shown) is extended through each aligned pair of slots 92 and holes 94 to interconnect the rake bracket 44 with the front bracket 58.

The assembly 10 also includes a display screen 96. The display screen 96. transmits signals corresponding to variable conditions that affect the manner in which the vehicle operates and displays the signals to the driver of the vehicle. A support ledge 100 interconnects the display screen 96 with the rake bracket 44 and maintains the screen 96 in a stationary position relative to the steering mechanism 28 and front bracket 58.

A steering mechanism support bracket 102 maintains the steering mechanism 28 in position relative to the steering tubes 32. In the embodiment shown in FIG. 1, the support bracket 102 also provides supplemental support to the display screen 96. The support bracket 102 is shown in FIG. 1 disposed against the mounting bracket 12, and includes spaced bores 104 through which the steering tubes 32 extend. The bracket 102 of the embodiments shown through FIGS. 1 through 6 includes a pair of spaced arms 106 that are interposed between pairs of the bores 104 and extend rearwardly to connecting ends 108 having holes 110 therethrough. The steering shaft 36 extends beneath the arms 106 with the lower bearing housing 50 extending beyond the connecting ends 108. A hinge bracket 112 extends from the lower bearing housing 50 to an end 114 positioned between the connecting ends 108. A bore 116 extends through the end 114 and is aligned with the holes 110 for receiving a hinge pin 118 therethrough, which in turn interconnects the lower bearing housing 50 and the support bracket 102.

The display screen 96 shown in FIG. 1 is connected to the steering mechanism support bracket 102 by a hinge assembly 120 that includes a first bracket 122 extending from the steering mechanism support bracket 102 and above the steering tubes 32. The bracket 122 has a hole 124 therethrough. A second bracket 128 extends from the display screen 96 and has a hole 130 therethrough in alignment with the hole 124. A complementary pin (not shown) extends through the holes 124 and 130 to connect the first and second brackets 122 and 126 together.

Referring specifically to FIGS. 2 and 7, an alternate embodiment of the assembly 10 includes a plurality of bolster sheer elements 160 that interconnect the bolster guide rods, or tubes, 18 and the mounting bracket 12. The bolster shear elements 160 comprise a bushing 160a. The bolster shear elements 160 operate to prevent movement of the knee bolster 14 relative to the mounting bracket 12 during normal operation, but are shearable in response to application of the predetermined collapse force to the knee bolster 14, which enables the bolster tubes 18 and the knee bolster 14 to move relative to the mounting bracket 12 along the collapse axis 20.

As is depicted schematically in FIG. 2, steering shear elements 162 identical to the bolster shear elements 160 shown in FIG. 7 interconnect the steering tubes 32 and the mounting bracket 12. The steering shear elements 162 prevent the steering mechanism 28 from moving relative to the mounting bracket 12 in the absence of application of an applied collapse force to the steering mechanism 28. However, upon application of an applied collapse force to the steering mechanism 28 greater then the holding force of the steering shear elements 162 on the mounting bracket 12 and steering tubes 32, the steering shear elements 162 shear, and the steering tubes 32 and the steering mechanism 28 move relative to the mounting bracket to the position shown in FIG. 3.

Referring again to FIG. 7, one of two connecting clamps 164 interconnects the rear ends 62 of each pair of the bolster tubes 18. The connecting clamp 164 is disposed against the mounting bracket 12 during nonnal operation and extends between opposed cylindrical ends 165 having openings 166 within which the rear ends 62 are received. The clamp 164 also has holes 168 through which fasteners 170 are received to secure the ends 165 about the ends 62 of the bolster tubes 18. This permits the clamp 164 to move with and provide support to the bolster tubes 18 upon movement of the tubes 18 in response to application of the predetermined collapse force on the knee bolster 14.

The assembly 10 also includes at least one and preferably two energy absorbing devices 172 for absorbing energy as the knee bolster 14 and bolster tubes 18 move relative to the mounting bracket 12. Each energy absorbing device 172 interconnects a selected one of the clamps 162 with the mounting bracket 12 and includes a housing 174 that is coupled to the mounting bracket 12. As is specifically shown in FIG. 7, each side of the mounting bracket 12 has a central opening 176 interposed between spaced holes 178. The housing 174 includes spaced connectors 180 which are received through the holes 178, which secures the housing to the mounting bracket 12. A plastically deformable strap 182 with opposed ends 186, 188 extends through the housing 174. End 186 is coupled to the clamp 162 using a fastener 187 and travels with the clamp 162 as the clamp 162 moves in response to application of the predetermined collapse force to the knee bolster 14. This draws the strap 182 through the housing 174 and across one or more anvils or other similar devices positioned in engagement with the strap 182 within the housing 174, which causes the strap 182 to absorb a controlled amount of energy through bending and friction as the bolster tubes 18 move relative to the mounting bracket 12.

At least one and preferably two second energy absorbing devices 173 are utilized for absorbing energy as the steering tubes 18 and steering mechanism 28 move relative to the mounting bracket 12. The second energy absorbing devices 173 are identical in structure and function to the energy absorbing devices 172. Each second energy absorbing device 173 utilized with the steering mechanism 28 interconnects the steering mechanism support bracket 102 with the mounting bracket 12 and functions to absorb energy as the steering tubes 32 and steering mechanism support bracket 102 move relative to the mounting bracket 12 in a manner like that of the energy absorbing devices 172 utilized with the bolster tubes 18. The second energy absorbing devices 173 used with the steering mechanism 28 are operable independently of the energy absorbing devices 172.

Each energy absorbing device 172 and second energy absorbing device 173 is preferably an anvil-strap device; however, one skilled in the art will recognize that any other suitable energy-absorbing device or devices may be used, including but not limited to those which employ one or more M-straps, J-straps, other straps, wires, or a combination thereof.

Each energy absorbing device 172 and second energy absorbing device 173 may also optionally include an actuating device 190, which selectively controls the amount of energy absorbed by the strap 182 by adjusting one or more of the frictional, resistance or bending forces generated by the strap 182 as the strap 182 moves through the housing 174. While any suitable actuating device may be utilized, the actuating device 190 is preferably an electrically activated pyrotechnic device which is operatively connected to a control system 192. The control system monitors and detects variable components affected during a collision event and actuates the device 190 in response to the collision event by communicating a signal to the device 190 corresponding to an appropriate amount of energy to be absorbed.

The assembly 10 also includes a pedal assembly, which is generally shown at 134 in FIG. 1. The pedal assembly 134 is carried by the steering tubes 32 and disposed against the rear bracket 60 for movement with the steering tubes 32 in response to movement of the steering tubes 32 through the rear bracket 60. The pedal assembly 134 includes a brake assembly 136 and a throttle assembly 138. A mounting assembly 140 interconnects the brake and throttle assemblies 136 and 138 with the rear bracket 60.

The brake assembly 136 includes a brake pedal 142. A first bracket 144 interconnects the brake pedal 142 and the mounting assembly 140. The first bracket 144 includes a spaced slot 146. An adjustment fastener 148 adjustably mounts the brake pedal 142 in the slot 146 for permitting adjustment of the position of the brake pedal 142 relative to the first bracket 144.

The throttle assembly 138 includes a throttle pedal 150. A second bracket 152 interconnects the throttle pedal 150 and the mounting assembly 140. Adjustment fasteners 154 adjustably mount the throttle pedal 150 in second slots 156 for adjusting the throttle pedal 150 relative to the second bracket 152. An intermediate bracket 158 interconnects the mounting assembly 140 and the rear bracket 42 and permits movement of the pedal assembly 134 in response to movement of the steering tubes 32. The intermediate bracket 158 carries the mounting assembly 140.

In operation, the assembly 10 is normally maintained in the position shown in FIG. 2. However, during a collision event severe enough to cause the knees of an individual seated before the assembly 10 to collide with the knee bolster 14 and apply a sufficient predetermined collapse force thereto, the bolster guide rods 18 will be released from the mounting bracket 12 and move in fixed relationship to one another and support guided, sliding movement of the knee bolster 14 along a predetermined collapse path that is parallel to the common collapse axis 20. In the event the collision event is severe enough to cause the upper torso of the individual to collide with the steering mechanism 28 and apply a sufficient predetermined collapse force thereto, the steering guide rods 32 will collapse independently from the bolster guide rods 18 along the second collapse axis 34.

As is shown in FIG. 3, the steering guide rods 32 and bolster guide rods 18 collapse and translate parallel to each another, but transversely to the longitudinal axis 30 of the steering column, which reduces the amount of energy that would otherwise be absorbed by the individual during a collision involving an assembly in which the direction of collapse of the components extended parallel to the longitudinal axis of the steering column. As the guide rods 32 and 18 collapse, the energy absorption devices 121 absorb additional energy released as a result of the collision event.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A collapsible knee bolster assembly comprising:
    a stationary mounting bracket for attachment to a vehicle support structure;
    a knee bolster;
    a knee bolster guide system connecting said knee bolster and said mounting bracket and supporting said knee bolster for guided sliding movement along a predetermined collapse path in response to application of a predetermined collapse force to said knee bolster;
    wherein said knee bolster guide system includes a plurality of bolster guide rods arranged about a common collapse axis extending parallel to said predetermined collapse path and interconnecting said mounting bracket and said knee bolster for supporting guided sliding movement of said knee bolster along the predetermined collapse path; and
    a plurality of bolster shear elements, said plurality of bolster shear elements coaxially enveloping said bolster guide rods, said plurality of bolster shear elements interconnecting said bolster guide rods and said mounting bracket for preventing movement of said knee bolster relative to said mounting bracket and shearable in response to application of the predetermined collapse force to said knee bolster for allowing said bolster guide rods and said knee bolster to move relative to the mounting bracket.

2. An assembly as set forth in claim 1 wherein each of said bolster shear elements comprises a bushing surrounding each bolster tube and engaging said mounting bracket.

3. An assembly as set forth in claim 1 wherein said mounting bracket supports said bolster guide rods in fixed relationship to one another.

4. An assembly as set forth in claim 3 wherein said bolster guide rods are straight.

5. An assembly as set forth in claim 4 wherein each of said bolster guide rods comprises a bolster tube.

6. An assembly as set forth in claim 5 wherein said bolster tubes comprise four tubes spaced from one another in a quadrangle.

7. An assembly as set forth in claim 5 including a steering mechanism carried by said mounting bracket and having a longitudinal axis extending in non-parallel relationship to said collapse axis.

8. An assembly as set forth in claim 7 wherein said steering mechanism includes a plurality of steering guide rods arranged about a second collapse axis in non-parallel relationship to said steering axis and interconnecting said mounting bracket and said steering mechanism and supporting said steering mechanism for guided sliding movement along said second collapse axis in response to application of a second predetermined collapse force to said steering mechanism.

9. An assembly as set forth in claim 8 including at least one energy absorbing device for absorbing energy during movement of said knee bolster relative to said mounting bracket.

10. An assembly as set forth in claim 9 and including at least one energy absorbing device for absorbing energy during movement of said steering mechanism relative to said mounting bracket.

11. An assembly as set forth in claim 10 wherein said at least one energy absorbing device is operable independently of said at least one second energy absorbing device.

12. An assembly as set forth in claim 11 wherein said mounting bracket supports said steering guide rods in fixed relationship to one another.

13. An assembly as set forth in claim 11 wherein said steering guide rods are straight.

14. An assembly as set forth in claim 13 wherein each of said steering guide rods comprises a tube.

15. An assembly as set forth in claim 14 wherein said steering tubes comprise four tubes spaced from one another in a quadrangle.

16. An assembly as set forth in claim 15 wherein said bolster tubes are disposed parallel to said steering tubes.

17. An assembly as set forth in claim 14 wherein said steering tubes have front and rear ends, a front bracket interconnecting said front ends of said steering tubes and a rear bracket supporting said rear ends of said steering tubes, said front and rear brackets being spaced from and on opposite sides of said mounting bracket, whereby said mounting bracket is spaced along said steering tubes from and between said front and rear brackets.

18. An assembly as set forth in claim 17 wherein said bolster tubes have front and rear ends, said knee bolster connected to said front ends of said bolster tubes and said rear bracket supporting said rear ends of said bolster tubes, said knee bolster and said rear bracket being spaced from and on apposite sides of said mounting bracket.

19. An assembly as set forth in claim 17 wherein said rear bracket includes a connector for attachment to the vehicle support structure.

20. An assembly as set forth in claim 17 wherein said mounting bracket includes an upper block having bores therethrough with said steering tubes extending through said bores and a lower black with bores therethrough with said bolster tubes extending through said bores in said lower block.

21. An assembly as set forth in claim 20 wherein said bolster tubes are disposed in at least one pair on either side of said steering tubes.

22. An assembly as set forth in claim 17 and including a pedal assembly carried by said steering tubes for movement therewith in response to movement of said steering tubes through said rear bracket.

23. An assembly as set forth in claim 22 wherein said pedal assembly is disposed against said rear bracket.

24. A collapsible knee bolster assembly comprising:
a stationary mounting bracket for attachment to a vehicle support structure,
a knee bolster,
a knee bolster guide system connecting said knee bolster and said mounting bracket and supporting said knee bolster for guided sliding movement along a predetermined collapse path in response to application of a predetermined collapse force to said knee bolster;
wherein said knee bolster guide system includes a plurality of bolster guide rods arranged about a common collapse axis extending parallel to said predetermined collapse path and interconnecting said mounting bracket and said knee bolster fix supporting guided sliding movement of said knee bolster along the predetermined collapse path; and
a plurality of bolster shear elements interconnecting said bolster guide rods and said mounting bracket for preventing movement of said knee bolster relative to said mounting bracket and shearable in response to application of the predetermined collapse force to said knee bolster for allowing said bolster guide rods and said knee bolster to move relative to the mounting bracket;
wherein each of said bolster shear elements comprises a bushing surrounding each bolster tube and engaging said mounting bracket.

25. An assembly as set forth in claim 24 wherein said mounting bracket supports said bolster guide rods in fixed relationship to one another.

26. An assembly as set forth in claim 25 including a steering mechanism carried by said mounting bracket and having a longitudinal axis extending in non-parallel relationship to said collapse axis.

27. An assembly as set forth in claim 26 wherein said steering mechanism includes a plurality of steering guide rods arranged about a second collapse axis in non-parallel relationship to said steering axis and interconnecting said mounting bracket and said steering mechanism and supporting said steering mechanism for guided sliding movement along said second collapse axis in response to application of a second predetermined collapse force to said steering mechanism.

28. An assembly as set forth in claim 27 including at least one energy absorbing device for absorbing energy during movement of said knee bolster relative to said mounting bracket.

29. An assembly as set forth in claim 28 and including at least one other energy absorbing device for absorbing energy during movement of said steering mechanism relative to said mounting bracket.

\* \* \* \* \*